Figure 3:
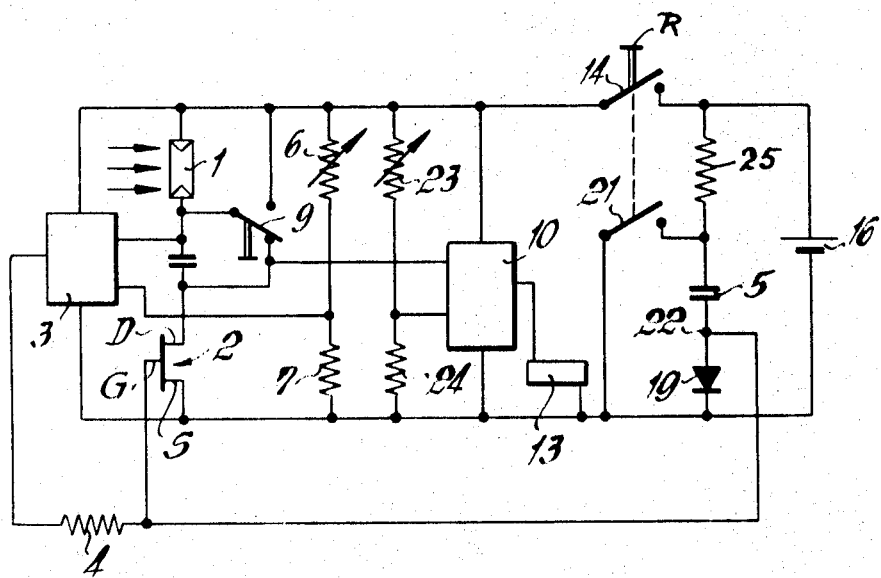

United States Patent

[11] 3,602,717

[72] Inventor Karl-Heinz König
   Boulanden, Germany
[21] Appl. No. 802,496
[22] Filed Feb. 26, 1969
[45] Patented Aug. 31, 1971
[73] Assignee Zeiss Ikon Aktiengesellschaft
   Stuttgart, Germany
[32] Priority Mar. 8, 1968
[33] Germany
[31] P 16 22 913.3

[54] AUTOMATIC PHOTOELECTRIC SHUTTER CONTROL CIRCUIT FOR SINGLE LENS MIRROR REFLEX CAMERAS
12 Claims, 5 Drawing Figs.

[52] U.S. Cl. .................................................. 250/210, 95/10
[51] Int. Cl. .................................................. E01c 7/10, H01j 39/12
[50] Field of Search .......................................... 250/210; 95/10

[56] References Cited
UNITED STATES PATENTS
3,324,779 6/1967 Nobusawa et al. ............. 95/10 X

| 3,458,770 | 7/1969 | Denger | 250/210 X |
| 3,473,036 | 10/1960 | Marcus | 250/210 X |
| 3,475,616 | 10/1969 | Stimson et al. | 250/210 X |
| 3,476,944 | 11/1896 | Odone | 250/210 X |

Primary Examiner—Roy Lake
Assistant Examiner—V. Lafranchi
Attorney—Singer, Stern & Carlberg ABSTRACT: The invention comprises an automatic photoelectric shutter control circuit for determining automatically the correct exposure for the film in a single lens mirror reflex camera. A self-balancing bridge circuit arranged in the camera has arranged in one branch a photoconductive cell and a semiconductor stage controlled according to its transmission characteristic, while the diagonal of the bridge contains an electronic switching device applying a voltage to a light value dependent RC member until the bridge is balanced. In this balanced condition a condenser is connected with the condenser of said RC member and the charging current of said first-named condenser corresponds to the exposure determining current flowing through said photoconductive cell and said semiconductor stage.

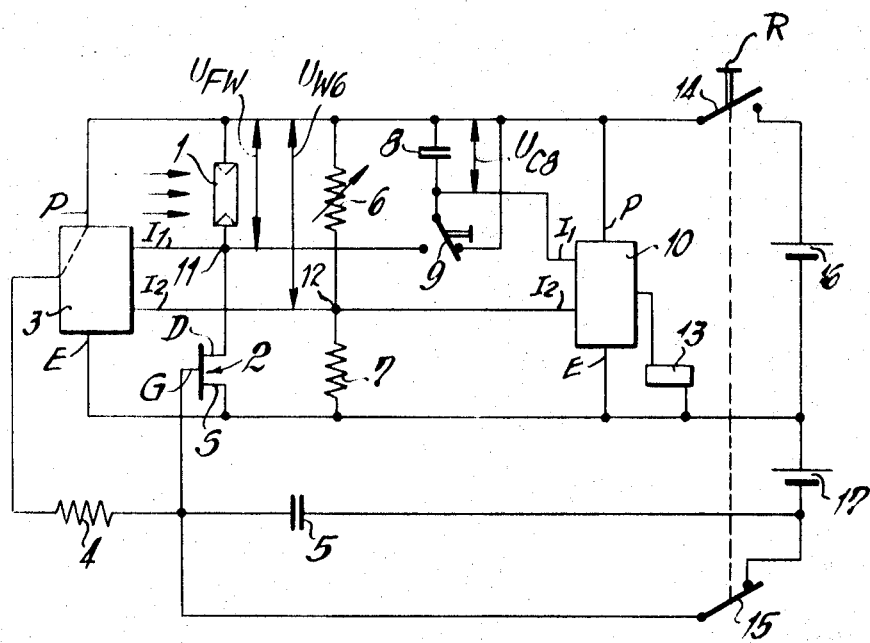

INVENTOR
Karl-Heinz König

By Singer, Stern & Carlberg
Attorneys

INVENTOR
Karl-Heinz König by Singer, Stern & Carlberg
Attorneys

AUTOMATIC PHOTOELECTRIC SHUTTER CONTROL CIRCUIT FOR SINGLE LENS MIRROR REFLEX CAMERAS

The invention relates to automatic photoelectric shutter control circuits which are intended for photographic cameras, particularly for single lens mirror reflex camera provided with an interior measurement of exposure values.

Electronic measuring devices for photographic cameras are already known which in their exposure-measuring circuit are equipped with a light value dependent RC member which controls an exposure time determining device. It is, however, not possible to employ these devices in single lens mirror reflex cameras provided with interior measurement and which employ a photoconductive cell because the latter in the observation position of the camera parts in view of the upward movement of the mirror is covered and will receive an incorrect measuring light so that the measuring value during the exposure of the film gets lost.

Also known is an electronic control device for a single lens mirror reflex camera in which two photoconductive cells are employed, of which one is so arranged that in the finder position of the mirror the resistance is energized by light, but this is not the case when the mirror is moved upwardly and the camera is in the film exposure position, while the second photoconductive cell responds to straight inverse light exposure conditions. The last-named photoconductive cell in the finder position of the camera is so arranged that it does not receive any light but it is subjected to the exposure light when the mirror has been moved into the exposure position. Both these mentioned photoconductive cells are arranged in parallel to one another to the exposure adjustment circuit and are intended to produce a short circuit effect.

The last named arrangement has the disadvantage that two photoconductive cells are required which at the same time have to have the same converting characteristics.

An object of the invention is a photographic camera, particularly a single lens mirror reflex camera, provided in its interior with an electronic measuring and storage arrangement for exposure values for the purpose of an automatic formation of an exposure adjustment factor, whereby this arrangement employs solely one light converter, namely, a photoconductive cell, which permits the creation of particular advantages. These advantages reside in a very small construction of the assembled details, that the exposure dependent charged RC member, even when predominantly high exposure of values are present, permit the storage of a sufficiently high voltage, but still the employment of large and expensive amplifiers is dispensed with. Furthermore, the arrangement is designed to work so rapidly that between the release of the camera shutter and the exposure of the film there will exist only a very insignificant short time parallax, and this is important. Furthermore, the arrangement has a high accuracy of the exposure value registration and operates independently of temperature and voltage variations.

The aforementioned features of the invention are obtained by an electronic measuring and storage arrangement for exposure values, particularly for single lens mirror reflex cameras provided with interior measurement and an exposure value dependent RC member for the purpose of an automatic formation of an exposure adjustment factor consisting in an exposure value measuring bridge with self-compensation, which in one branch of the bridge has arranged in series an interior measuring light converter, such as a photoconductive cell, a semiconductor stage controlled by transmission characteristics, while in the diagonal of the bridge circuit an electronic switching device is arranged which causes the condenser of the RC member to receive voltage up to the balancing of the bridge, whereby the charged condenser upon the balancing of the bridge is connected with an additional condenser and charges the same with current by the semiconductor stage, whereby this current at the moment the bridge is balanced corresponds as far as exposure value and characteristics is concerned to the bridge current flowing through the photoconductive cell and the semiconductor stage.

A particular object of the invention is that the controlable semiconductor resistance stage comprises a field effect transistor, and that the condenser which is charged during the time the bridge is balanced is connected with a control electrode of the field effect transistor, so that after the bridge has been balanced the additional condenser is charged with current by the field effect transistor whose characteristic dependent amplitude is determined by the charging voltage of the condenser which is applied to the control electrode of the field effect transistor.

Still another object of the invention is that a preadjusted compensating resistance is arranged in the bridge-balancing branch, parallel to the photoconductive cell circuit, and that an electronic switching device which is connected to the diagonal points of the bridge is so constructed that it becomes disconnected when the voltages on the photoconductive cell and on the compensation resistance are alike.

A preferred construction of the arrangement of the invention resides in this, that the electronic switching device consists substantially of a transistor with transistorized self-holding, whereby the transistor when the arrangement is rendered operative and during the bridge-balancing operation supplies the condenser with voltage, and that the transistorized self-holding arrangement connected on one hand to the voltage $U_{FW}$ and on the other hand to the voltage $U_{HB}$ does drop when the voltages are equal and block the transistor.

A substantial purpose of the invention resides in this, that the additional condenser is connected by means of a switch to the condenser controlled source-drain-stage of the field effect transistor for the purpose of charging, which switch is closed when the camera parts are switched to the exposure position.

The above objects and additional objects of the invention will be further described with reference to the accompanying drawing which illustrate a few embodiments of the invention.

In the drawing:

FIGS. 1, 2, and 3 each illustrate a circuit diagram of different embodiments of the invention.

Figure 4:
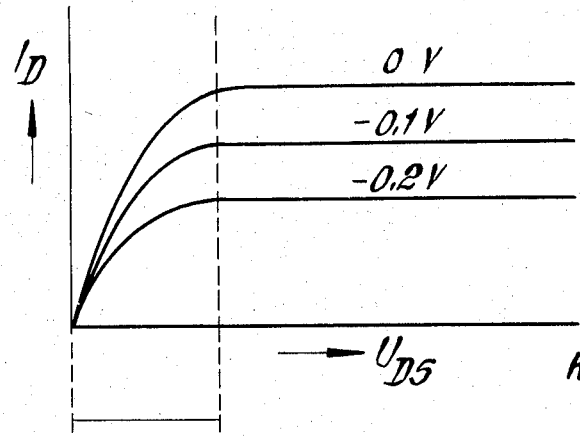
Figure 5:
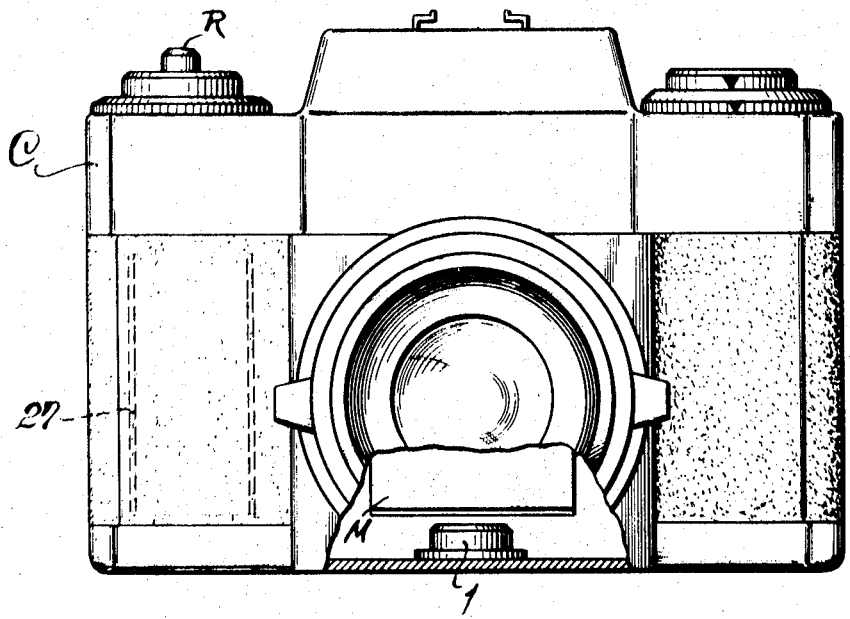

FIG. 4 discloses a diagram of the characteristics of the field effect transistor 2 in which with the gate control bias voltages are entered as parameter and in relation to the source-drain-voltage, and FIG. 5 illustrates a front elevation view of a single lens mirror reflex camera with a portion broken away to show the arrangement of the photoconductive cell in its interior.

The FIGS. 1 to 3, as far as the circuits are concerned, discloses the starting or nonoperative position of the arrangements.

Referring to the drawings, the FIGS. 1, 2, and 3 disclose each a circuit with a photoconductive cell 1 which is arranged with the field effect transistor 2 (unipolar transistor) in one of the branches of the bridge circuit. The other branch of the bridge circuit is formed by the resistances 6 and 7 of which the resistance 6 is so constructed that it can be adjusted once. The diagonal branch of the bridge which is connected to the terminals 11 and 12 contains the self-holding means of the electronic switching device 3. A battery 16 serves as a common source of supply voltage. It supplies current to the circuit arrangement when the switch 14 is closed. When the switch 14 is closed another switch 15 mechanically coupled with switch 14 is opened.

The electronic switching device 3, when may also be designated as a regulating time trigger, is provided with a gate transistor which is closed when the switching device is closed. When the switching device 3 closes a connection is established along the indicated dashline between the positive terminal of the battery 16 and the resistor 4 followed by the gate electrode G of the transistor 2 and one layer of the condenser 5 connected to the gate electrode G. A condition of this connection is, however, that the switch 14 is closed, but this will be discussed later when the operation of the arrangement is explained.

The condenser 5 which is connected with the gate transistor of the switching device 3 and also with the resistance 4 and with the battery 16 is in its starting or rest position short-circuited by the contact 15. As already stated one of the layers of the condenser 5 is connected with the gate electrode G of the field effect transistor 2 which latter by means of the switch 15 is connected with the negative pole of a gate bias battery 17. The resulting negative bias voltage of the gate electrode G relative to the source S indicates that the semiconductor stage arranged between the sources S and the drain D in the rest position of the circuit represents a practically infinitely high-resistance value.

The condenser 5 and the resistance 4 connected thereto form the RC member, to become charged to a voltage value during the exposure value measuring operation which takes place when the camera parts are in a view finder position, whereby the mentioned voltage value depends upon the exposure value dependent resistance value of the photoconductive cell 1 and the characteristic of the field effect transistor 2 in the left-hand branch of the bridge according to FIG. 4 and on the adjustment of the compensating resistance 6 in the right-hand branch of the measuring bridge. As soon as the measuring operation is completed by a balanced condition of the bridge, in which condition the gate transistor blocks the connection indicated in a dashline, the connection of the resistance 4 and the condenser 5 to the battery 16 is separated. The charge accumulated on the condenser 5 remains, however, unchanged for a longer period of time owing to the high input resistance on the field effect transistor and is effective in full amplitude on the gate. This charge, therefore, is also available for the control of the drain current when on account of a flipover of the camera parts into the exposure position the photoconductive cell becomes darkened.

It has already been mentioned that the bridge consisting of circuit elements 1, 2, on one hand, and 6, 7, on the other hand, effects a self-balance in such a manner in that the electronic switching device 3 becomes disconnected and that thereby the gate transistor disconnects the condenser 5 from the voltage when a voltage balance is obtained on the photoconductive cell 1 and on the compensating resistance 6, namely when $U_{FW}=U_{H6}$. This self-balancing operation, obviously, excels a manually obtained balancing condition as far as accuracy and speed is concerned, since in the described manner the time parallax between the release and the exposure remains undiscernably small.

The condenser 8 serves as a repeat condenser with respect to the first storage condenser 5. The problem is now to transfer the charge which has reached the condenser 5 up to the balancing point of the bridge to the condenser 8 which corresponds to a current which corresponds to the exposure value dependent bridge balancing current in the left-hand branch in the moment of the balancing condition.

An important feature of the bridge circuit of the invention resides in this, that based upon a constant bridge-balancing voltage which is predetermined by W6 an exposure value dependent current flows in the left-hand bridge branch when a balance has been obtained, whereby this current is independent of the predetermined characteristic of the semiconductor stage 2 in the left-hand branch of the bridge within existing limits of the current control possibility. This means that temperature and aging should have no falsifying influence on the arrangement.

The condenser 5 is charged to a voltage which insofar is dependent on the characteristic of the semiconductor stage 2 as it permits such a current to flow through the semiconductor stage after balance into the additional condenser 8 which current corresponds to the current in the left-hand branch of the bridge when the bridge is in balance.

For this purpose there is first closed the switch 9 when the camera parts are moved into exposure position. This closing of the switch 9 has the result that the condenser 8 is connected with the source-drain-stage of the field-effect transistor 2 which latter in its current flow condition is controlled according to the characteristic of the charging voltage of the condenser 5 which is connected to the gate. Accordingly, the condenser 8 is charged with the current according to the mentioned characteristic and this current is the result of the control voltage, namely the voltage of the condenser 5, on the gate and the resulting drain current. Since, however, the charging voltage of the condenser 5 is a function of the bridge-balancing condition the charging current of the condenser 8 corresponds to the bridge current in its balanced condition which in turn again among other things is a function of the exposure value.

A conventional time trigger 10 is supplied with voltage when the arrangement of the invention is energized which takes place when the switch 14 is closed thus causing a holding solenoid 13 to be energized. The latter may, for instance, hold the second curtain of a curtain shutter a sufficient period of time until the necessary time has elapsed for the arrangement for the invention to determine the exposure value which is necessary for a correct exposure of the film in the camera. When then the time trigger flips over and disconnects the solenoid 13 the second curtain may follow the first curtain and leave between these two curtains a slot which corresponds to the determined exposure time.

The time trigger 10 connected with the repeat condenser 8 is controlled by the charging voltage of the latter in such a manner that it flips when $U_{C8}$ reaches a release threshold value which is equal to the voltage value $U_{H6}$ on the compensating resistance 6. Preferably, the time trigger 10 is so constructed that a transistor holds this trigger owing to the difference voltage $U_{H6}>U_{C8}$, but drops when this difference disappears. During its dropping operation it releases the self-holding of the time trigger 10 and therewith the current disappears in the holding solenoid 13.

The operation of the circuit arrangement illustrated in FIG. 1 is as follows:

In the rest position of the arrangement the switch 14 is open and the switch 15 is closed and a negative voltage from the negative terminal of the battery 17 is delivered to the gate G of the field-effect transistor 2 by means of the switch 15. This negative voltage has the result that the source-drain-stage S,D has a practically infinitely resistance. When now the switch 14 is closed, resulting in the switch 15 being opened, the result will be that the time trigger 10 and also the electronic switching device 3 is receiving the voltage of the battery 16. The switches 14 and 15 may be so arranged that they are both operated when the camera release member R is actuated. In a photographic camera which is provided with a curtain shutter the first curtain will be caused to start running, but the second curtain will be held against movement by the solenoid 13 which has been energized by the time trigger 10.

The bridge circuit is now supplied with voltage and the switching device 3, which is also supplied with voltage, closes its self-holding circuit, the holding condition of which is determined by the difference between the voltages $U_{FW}$ and $U_{H6}$ on the photoconductive cell and on the compensating resistance 6. This means that the switching device 3 will be disconnected as soon as these two voltages have become alike.

The gate transistor of the switching device 3 closes the connection indicated in a dash line, which in connection with the opened switch 15 has the result that by means of the switching device 3 and the resistance 4 the positive terminal of the battery 16 is connected with the condenser 5 which in turn causes the application of a less negative bias voltage to the gate G. Accordingly, the the condenser 5 can be charged as soon as the device 3 is closed.

During the illumination of the photoconductive cell 1 its resistance is lowered when the illumination value increases and this produces a current in the left-hand branch of the bridge circuit. This current is exposure dependent and also dependent on the characteristic of the photoconductive cell and increases when the gate bias voltage increases until the bridge circuit is in balance. As already mentioned, a condition of the self-balancing bridge is that $U_{FW}=U_{H6}$. It is obvious, that at a higher illumination value and a lower resistance of the photoconductive cell 1 a stronger current is required in the left-hand branch of the bridge 1,2 is necessary in order to produce the required voltage $U_{Fw}$ on the photoconductive cell 1 as when a lower illumination value is present and, accordingly, a higher resistance of the photoconductive cell 1 would be present.

The condenser 5 up to the time the bridge is in balance has received a charge which is exposure value dependent and also dependent on its characteristic. The characteristic of the field-effect transistor 2 to be used, as shown in FIG. 4, consist of the inclined portion which is indicated by the double arrow; preferably, however, one uses the right-hand portion which extends parallel to the abscissa and is largely independent of $U_{DS}$. At a temperature dependent or aging dependent change of the gate control voltage which is inserted at parameter, the drain current jumps from one characteristic to the other, but this is compensated by the self-balancing bridge circuit and the corresponding control voltage of the condenser 5 which becomes effective after the balance has been obtained.

When the balance of the bridge has been obtained the switching device 3 disconnects itself and the gate transistor opens the connection of 4,5 to the battery. The charged condenser 5 is now connected with the gate electrode of the field-effect transistor 2 whose input resistance is so high that the charge remains for a longer period of time on the condenser 5. As soon as the camera parts go, however, into the exposure position and the photoconductive cell is cut off from illumination the switch 9 which, for instance, is actuated by the mechanism which operates the mirror M in the camera is switched toward the left and this causes a connection of the repeat condenser 8 with the voltage source by means of the condenser 5 controlling the semiconductor stage S,D of the field-effect transistor 2. Its current which in the self-balancing moment of the bridge has been flowing and has charged the condenser 5 is represented by the current relation of the left bridge branch in the balancing moment and lasts as long as $U_{C8}=U_{w8}$. In this moment the time trigger 10 loses its self-holding property, the holding solenoid 13 becomes deenergized and the second curtain is released to follow the first curtain of the curtain shutter.

In the circuit illustrated in FIG. 1 the condenser 8 when connected is arranged parallel to the darkened photoconductive cell 1. The photoconductive cell 1 when dark has such a high resistance that a discharge in the parallel path of the condenser 8 is not likely to be present. In order, however, to prevent any discharge in this manner FIG. 2 illustrates a preferred arrangement of the switch 9 so that in the exposure position of the camera parts a short-circuiting of the photoconductive cell 1 takes place.

In FIG. 2 the resistances 23 and 24 at the disclosed position of the switch 9 constitute a voltage divider arrangement which has the effect that the time trigger 10 tilts at a higher threshold voltage than the switching device 3. The higher charging voltage necessary on the condenser 8 which requires that $U_{C8}=U_{w23}$ requires solely a time increase about a constant factor which is incorporated in all exposure time forming values and may be considered in another manner or may be eliminated. It should also be noted that other positions and other constructions of the switch 9 are possible which have the effect that one is able to be more liberal with the threshold voltages of the trigger, so that one may dispense with the disclosed voltage divider arrangement.

The bias battery 17, as it is apparent from the circuit arrangement shown in FIG. 3 may be replaced by a circuit comprising in a series arrangement a diode 19, a storage condenser 5 and a protective resistance 25. This circuit is arranged in parallel to the battery 16. To this mentioned circuit also belongs a switch 21 which at a suitable time is able to short circuit this mentioned circuit. At a point 22 between the condenser 5 and the diode 19 the control voltage of the condenser 5 is tapped and conducted to the gate G.

The two mechanically coupled switches 14 and 21 are so constructed that when the camera release R is depressed the switch 21 is closed first and then after a short delay the switch 14 is closed. This has the purpose to assure that prior to the connection of the trigger, particularly the regulating trigger 3, there is first applied a sufficiently negative blocking voltage to the gate of the field-effect transistor 2 which prevents, when the arrangement is put into operation, there will flow at once such a current through the left-hand branch of the bridge which would cause a spontaneous nonlight value related self-balancing of the bridge.

The operation of the diode circuit comprising the condenser 5 and the diode 19 is as follows:

Prior to the actuation of the switches 14 and 21 which in the disclosed arrangement of FIG. 3 are in their inoperative position, the condenser 5 has been charged by the battery in the low resistance direction poled diode 19. This has the result that the current in this branch has been decreased to zero and the voltage on the gating is substantially zero. If, in this condition the bridge circuit is provided with voltage, a strong current passing through the field-effect transistor 2 could not be prevented. Therefore, upon actuation of the camera release R the switch 21 is closed first and this has the result that the charges of the condenser 5 are applied blockingly to the diode. A charge of about minus 4.5 volt on the gate G assures that the current flowing through the S,D stage of the field-effect transistor 2 is practically zero.

Shortly, thereafter, the switch 14 is closed and, accordingly, the triggers 3 and 10 receive voltage, whereby the gate transistor of the trigger 3 closes in a manner already described. By means of the resistance 4 on one hand, and the switch 21 on the other hand, the condenser is now connected with the battery 16 and is recharged. This means that the charge on the condenser becomes less negative without, however, leaving the negative voltage range. Already at weak negative control voltages on the gate G a current of such magnitude flows through the field-effect transistor that even at higher light values a balancing of the bridge takes place. The diode which is arranged in parallel to the condenser 5 remains during these voltage values on the condenser in its locking condition so that no impairment of the condenser charge takes place.

After the bridge has been balanced and the switch 9 has been moved up into the position in which the photoconductive cell is short-circuited the condenser 5 transmits the same control functions to the field-effect transistor 2 which have already been explained in connection with the previously described circuit arrangements.

The advantages of the circuit arrangements of the invention are as follows:

An automatic electronic balancing of the measuring bridge takes place within the shortest possible time which includes a storage of the bridge condition after a balance of the same has been obtained. In this manner the time parallax between the release of the camera shutter and the exposure of the film is increased only very immaterially within selectable values.

The circuit arrangement has a great resistance-measuring range because after a balance has been obtained there will be on the photoconductive cell and on the field-effect transistor always a battery voltage, for instance, of U Batt/2, or another contact part of the same.

Voltage and temperature changes have no influence on the measuring value formation. Also any instabilities of the gate bias voltage do not produce any measuring errors because even influences of the environment and the changed characteristic of the field-effect transistor caused thereby or changes in another controllable resistance will always be adjusted by the necessary current, for instance, the drain current by means of the resistance 4 and the condenser 5 to effect a balance.

The current arrangement operates already at a very low supply voltage. Furthermore, high ohmic "rapid" photoconductive cells can be used. It is assumed that a photoresistance cell is used having a gradient 1.

The circuit elements disclosed in the FIGS. 1 to 3, inclusive, are mounted on a carrier plate 27 (FIG. 5) mounted in the camera casing C.

What I claim is:

1. Automatic photoelectric shutter control circuit, particularly for single lens mirror reflex cameras equipped in its interior with a measuring and light value dependent RC member for an automatic formation and adjustment of an exposure value, means forming a self-balancing light value measuring bridge, one branch of which has arranged therein in series a photoconductive cell and a semiconductor stage controlled according to its transmission characteristic an electronic switching deice arranged in the diagonal of said bridge, said switching device applying a voltage to the condenser of said RC member until the bridge is balanced, another condenser, and means for connecting the condenser of said RC member when said bridge is balanced with said other condenser for charging the latter with a current by means of said semiconductor stage, said last-named charging current in the moment said bridge is balanced corresponding to the exposure dependent bridge current flowing through the photoconductive cell and said semiconductor stage.

2. An arrangement according to claim 1, in which said controllable semiconductor stage comprises a field-effect transistor having a control electrode (G), and that the condenser which is charged during the balancing operation of said bridge is connected with said control electrode, so that after the completion of said bridge-balancing operation said other condenser is charged with a current whose exposure value dependent amplitude is controlled by the charging voltage of the condenser connected with said electrode of said field-effect transistor.

3. An arrangement according to claim 1, including a preadjusted compensating resistance (6) in the bridge-balancing branch and arranged in parallel to the circuit of said photoconductive cell, said electronic switching deice in said diagonal of said bridge being so constructed that it becomes disconnected when the voltages on said photoconductive cell and on said compensating resistance are alike.

4. An arrangement according to claim 3, in which said electronic switching device comprises a gate transistor with transistorized self-holding, manually operable switch means (14, 15) for rendering said arrangement operative, said gate transistor in the operative condition of said arrangement and during the balancing operation of said bridge supplying said condenser of said RC member with voltage, whereby the transistorized self-holding is rendered inoperative when said voltages are alike and causes said transistor to be blocked.

5. An arrangement according to claim 1, including a source-drain-stage (SD) controlled by the condenser of said RC member and a switch (9) for connecting said other condenser to said source-drain-stage, and means for closing said switch when the camera is adjusted to the exposure position.

6. An arrangement according to claim 1, including a time trigger (10), and means for connecting said other condenser controllably and releasably to said time trigger, means for connecting said time trigger to the balancing branch of said bridge, said trigger being tripped when the charging voltage of said other condenser being equal to the bridge-balancing voltage (FIG. 1).

7. An arrangement according to claim 1, including a source-drain-stage (SD) controlled by the condenser of said RC member and a switch (9) for connecting said other condenser to said source-drain-stage, means for closing said switch when the camera is adjusted to the exposure position, and means for arranging said switch in such a manner that it arranges said other condenser in parallel to said photoconductive cell (FIG. 1).

8. An arrangement according to claim 1, including a source-drain-stage (SD) controlled by the condenser of said RC member and a switch (9) for connecting said other condenser to said source-drain-stage, means for closing said switch when the camera is adjusted to the exposure position, and means for arranging said switch in such a manner that it short circuits said photoconductive cell (FIG. 2).

9. An arrangement according to claim 2, including a battery (17) which prior to the operation of said arrangement supplies a bias voltage to the gate of said field effect transistor (FIG. 1).

10. An arrangement according to claim 2, including a diode circuit (FIG. 3) which prior to the operation of said arrangement supplies a bias voltage to the gate of said field effect transistor.

11. An arrangement according to claim 2, including a diode circuit (FIG 3) which prior to the operation of said arrangement supplies a bias voltage to the gate of said field-effect transistor, and a switch (21) for connecting said diode circuit temporarily to said field-effect transistor in such a manner that the latter receives a blocking bias voltage.

12. An arrangement according to claim 2, including a diode circuit (FIG. 3) which prior to the operation of said arrangement supplies a bias voltage to the gate of said field-effect transistor, a switch (21) for connecting said diode circuit temporarily to said field-effect transistor in such a manner that the latter receives a blocking bias voltage, and another manually operable switch (14) mechanically coupled to said first-named switch in such a manner that upon actuation of said manually operable switch said first named switch is closed first and thereafter said manually operable switch.